US012732544B2

(12) United States Patent
Roytman et al.

(10) Patent No.: US 12,732,544 B2
(45) Date of Patent: Sep. 8, 2026

(54) LLM TECHNOLOGY WITH HUMAN INPUT REINFORCEMENT LEARNING FOR SUGGESTING THE FOLLOW UP RESPONSE ACTIONS TO DETECTIONS AND INCIDENTS

(71) Applicant: Cisco Technology, Inc., San Jose, CA (US)

(72) Inventors: Michael Roytman, Swannanoa, NC (US); Tian Bu, Basking Ridge, NJ (US)

(73) Assignee: Cisco Technology, Inc., San Jose, CA (US)

( * ) Notice: Subject to any disclaimer, the term of this patent is extended or adjusted under 35 U.S.C. 154(b) by 19 days.

(21) Appl. No.: 18/808,938

(22) Filed: Aug. 19, 2024

(65) Prior Publication Data

US 2025/0286914 A1 Sep. 11, 2025

Related U.S. Application Data

(60) Provisional application No. 63/562,614, filed on Mar. 7, 2024.

(51) Int. Cl.
*H04L 9/40* (2022.01)

(52) U.S. Cl.
CPC ........ *H04L 63/205* (2013.01); *H04L 63/1425* (2013.01); *H04L 63/1441* (2013.01)

(58) Field of Classification Search
None
See application file for complete search history.

(56) References Cited

U.S. PATENT DOCUMENTS

| | | | | |
|---|---|---|---|---|
| 12,001,549 | B1 | 6/2024 | Schindel et al. | |
| 2020/0401696 | A1* | 12/2020 | Ringlein | G06N 3/08 |
| 2021/0120043 | A1* | 4/2021 | Karpovsky | H04L 63/205 |
| 2021/0297427 | A1 | 9/2021 | Narula | |
| 2022/0150271 | A1 | 5/2022 | Shah | |

(Continued)

OTHER PUBLICATIONS

Bill D., et al., "Fine-tuning a LLM using Reinforcement Learning from Human Feedback for a Therapy Chatbot Application", Bachelor Thesis School of Electrical Engineering and Computer Science at Royal Institute of Technology, Diva Portal, Jul. 15, 2023, 15 Pages.

(Continued)

*Primary Examiner* — William J. Goodchild
(74) *Attorney, Agent, or Firm* — Polsinelli P.C.

(57) ABSTRACT

A system and method are provided for providing guidance to SOC professionals regarding follow-up response actions to detection incidents. A machine-learning (ML) model is trained to receive incident data for security incidents/detections. The ML model then classifies the incidents/detections and determines thereby follow-on actions. Using the trained ML model to automatically generate follow-on actions enables the Security Operation Center (SOC) to timely triage and remediate a high volume of security incidents/detections. Reinforcement training data is generated based on user feedback generated when the SOC reviews the generated follow-on actions and then responds to the incident. The reinforcement training data is used to update and improve the ML model, allowing the ML model to adapt to evolving security threats and conform to current best practices.

20 Claims, 6 Drawing Sheets

(56) References Cited

U.S. PATENT DOCUMENTS

| | | | |
|---|---|---|---|
| 2022/0198322 | A1* | 6/2022 | Kuperman .......... H04L 63/1441 |
| 2023/0146804 | A1 | 5/2023 | Narula |
| 2024/0104336 | A1 | 3/2024 | Irving et al. |
| 2024/0202405 | A1 | 6/2024 | Lang et al. |
| 2024/0223592 | A1 | 7/2024 | Bazalgette et al. |

OTHER PUBLICATIONS

International Search Report and Written Opinion for PCT Application No. PCT/US25/18149, dated May 1, 2025, 11 Pages.

* cited by examiner

DECODE BLOCK 314a

LLM TECHNOLOGY WITH HUMAN INPUT REINFORCEMENT LEARNING FOR SUGGESTING THE FOLLOW UP RESPONSE ACTIONS TO DETECTIONS AND INCIDENTS

CROSS-REFERENCE TO RELATED APPLICATIONS

This application priority to U.S. provisional application No. 63/562,614, titled "LLM TECHNOLOGY WITH HUMAN INPUT REINFORCEMENT LEARNING FOR SUGGESTING THE FOLLOW UP RESPONSE ACTIONS TO DETECTIONS AND INCIDENTS," and filed on Mar. 7, 2024, which is expressly incorporated by reference herein in its entirety.

BACKGROUND

Extended detection and response (XDR) is a cybersecurity technology that monitors and reduces the risk of cybersecurity threats. XDR collects and correlates data from various security layers, such as email, endpoints, servers, cloud workloads, and networks. The data collected via XDR can analyzed and correlated, lending it visibility and context, and revealing advanced threats. Thereafter, the threats are prioritized, analyzed, and sorted to prevent security collapses and data loss. The XDR system helps organizations to have a higher level of cyber awareness, enabling cyber security teams to identify and eliminate security vulnerabilities.

By providing more visibility and context into threats, XDR can detect many possible security events and bring those possible security events to the attention of security teams, allowing security teams to address these events and reduce the severity and scope of the attack.

Similar to XDR, endpoint detection and response (EDR) and network detection and response (NDR) are also cybersecurity technologies that monitor and mitigate cybersecurity threats. The difference among these three is largely due to the scope of telemetry data being monitored.

Relatedly, security information and event management (SIEM) tools provide a way to centrally collect pertinent log and event data from various security, network, server, application, and database sources. SIEMs then detect and alert on security events. For example, an SIEM tool can detect an abnormal number of login attempts on a system and alert the security team to investigate the potential of a compromised system or compromised user credentials. Generally, SIEM tools can collect data from firewalls, intrusion prevention systems, antivirus and antimalware software, DNS servers, data loss prevention tools, and secure web gateways.

Security orchestration automation and response (SOAR) solutions aim to streamline orchestration and response through automation tools. SOAR platforms can use an orchestration tool called a "playbook," which is manually assembled by a security team, to plan a sequence of actions in response to a threat. Parts of this plan may be streamlined through automation.

Generally, security teams have the responsibility of filling the gaps that are not performed by one or more of the above tools. For example, after notification of an incident by an XDR, the security is left to analyze and assess the threat, and, if the incident poses a viable threat, the security team can choose the appropriate playbook for responding to the incident. When there are a large number of incidents, Decision fatigue can lead to errors by the security team, and a high volume of incidents can result in a backlog in which threats are not remediated promptly, resulting in compromise.

Accordingly, improved methods are desired for guiding security teams to more quickly and accurately respond to detected incidents.

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
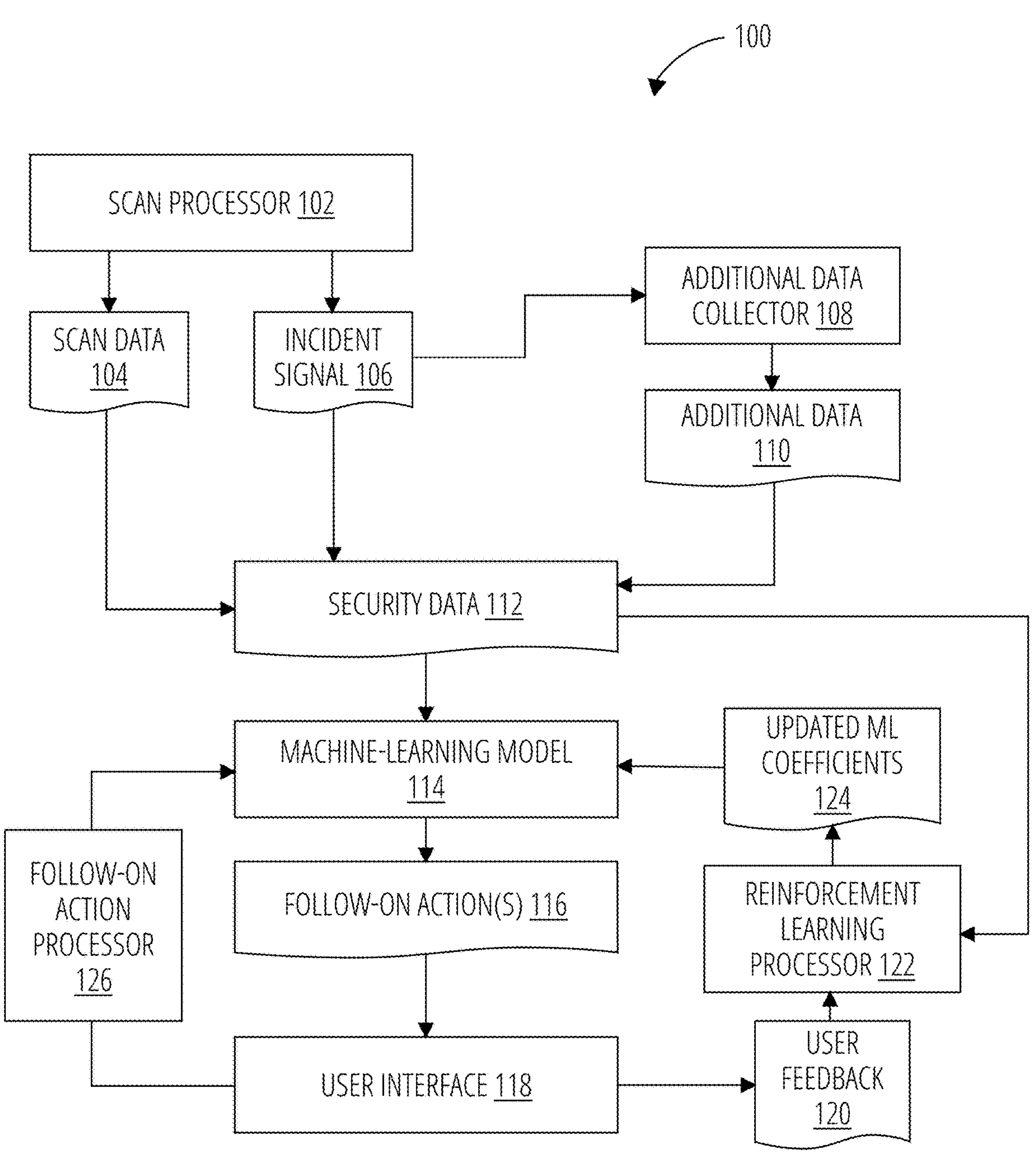
FIG. 1 illustrates a block diagram for an example of a system/device for recommending follow-on actions when responding to a possible security incident, in accordance with certain embodiments.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

In some aspects, the techniques described herein relate to a method of recommending a follow-on action for a security incident, the method including: receiving an indication of a security incident and receiving security data corresponding to the security incident; applying the security data to a machine-learning model to determine a follow-on action in response to the security incident; signaling the follow-on action to security personnel; receiving feedback from the security personnel, the feedback including indicia whether the follow-on action is a correct response to the security incident; generating reinforcement training data based on the feedback; and training the machine-learning model using the reinforcement training data to perform reinforcement learning on the machine-learning model.

In some aspects, the techniques described herein relate to a method, wherein: the machine-learning model is an artificial neural network in which weighting coefficients between respective layers are used to combine values of nodes at a layer to generate values at nodes of a subsequent layer in the artificial neural network, training the machine-learning model by using the reinforcement training data includes adjusting the weighting coefficients between one or more layers of the artificial neural network to minimize a loss function representing in part a difference or a proximity between the correct response to the security incident and an output of the machine-learning model in response to applying the security data, wherein the correct response to the security incident is based on the feedback.

In some aspects, the techniques described herein relate to a method, wherein training the machine-learning model by using the reinforcement training data includes fine tuning the machine-learning model by unfreezing a subset of coefficients of the machine-learning model and optimizing a loss function between the correct response to the security incident and an output of the machine-learning model in response to applying the security data.

In some aspects, the techniques described herein relate to a method, further including: obtaining a record of actions taken by the security personnel while responding to the security incident; determining the correct response to the security incident based on the record of actions taken by the security personnel, when the feedback indicates that the follow-on action that is signaled to the security personnel is not the correct response to the security incident; and including the correct response to the security incident in the feedback.

In some aspects, the techniques described herein relate to a method, further including: determining that the correct response to the security incident is the follow-on action that is signaled to the security personnel, when the feedback indicates that the follow-on action that is signaled to the security personnel is the correct response to the security incident.

In some aspects, the techniques described herein relate to a method, further including: detecting the security incident based on one or more of: a vulnerability scan of a network and generating scan data, the scan data including data on which detection of the security incident was based, and the scan data including network scan data; an authenticated network scan data; vulnerability and asset assessment data, configuration data; signal captured at endpoints and/or networks; statistical profiling of network traffic; file operations at endpoints; malicious email; or threat intelligence data, wherein the security data applied to the machine-learning model includes the scan data.

In some aspects, the techniques described herein relate to a method, further including: collecting, after detecting the security incident, additional data that is determined to be relevant to the security incident, the additional data including ongoing incident response data, telemetry, log data, traffic data, or metadata, wherein the security data applied to the machine-learning model includes the additional data.

In some aspects, the techniques described herein relate to a method, wherein the machine-learning model has been trained to use correlations between the scan data and the additional data to predict the follow-on action based on patterns in the scan data.

In some aspects, the techniques described herein relate to a method, wherein: the follow-on action includes a decision tree having one or more branches at which the security personnel interacts with the network resulting in additional information about the security incident, and the method further includes: applying the additional information together with the security data to the machine-learning model to determine another follow-on action in response to the security incident; signaling the another follow-on action to security personnel; receiving another feedback from the security personnel, the another feedback including indicia whether the another follow-on action is the correct response to the security incident; generating reinforcement training data based on the another feedback.

In some aspects, the techniques described herein relate to a method, wherein signaling the follow-on action to the security personnel further includes ranking two or more follow-on actions and assigning respective scores corresponding to likelihoods that the two or more follow-on actions are the correct response to the security incident, and displaying to the security personnel a ranked list of the two or more follow-on actions and/or the two or more follow-on actions with the respective scores.

In some aspects, the techniques described herein relate to a method, further including: determining a label based on the feedback; and associating the label with the follow-on action and the security data to generate the reinforcement training data.

In some aspects, the techniques described herein relate to an apparatus including: a processor; and a memory storing instructions that, when executed by the processor, configure the apparatus to: receive an indication of a security incident and receiving security data corresponding to the security incident; apply the security data to a machine-learning model to determine a follow-on action in response to the security incident; signal the follow-on action to security personnel; receive feedback from the security personnel, the feedback including indicia whether the follow-on action is a correct response to the security incident; generate reinforcement training data based on the feedback; and train the machine-learning model using the reinforcement training data to perform reinforcement learning on the machine-learning model.

In some aspects, the techniques described herein relate to an apparatus, wherein: the machine-learning model is an artificial neural network in which weighting coefficients between respective layers are used to combine values of nodes at a layer to generate values at nodes of a subsequent layer in the, training the machine-learning model by using the reinforcement training data includes adjusting the weighting coefficients between one or more layers of the artificial neural network to minimize a loss function representing in part a difference or a proximity between the correct response to the security incident and an output of the machine-learning model in response to applying the security data, wherein the correct response to the security incident is based on the feedback.

In some aspects, the techniques described herein relate to an apparatus, wherein training the machine-learning model by using the reinforcement training data includes fine tuning the machine-learning model by unfreezing a subset of coefficients of the machine-learning model and optimizing a loss function between the correct response to the security incident and an output of the machine-learning model in response to applying the security data.

In some aspects, the techniques described herein relate to an apparatus, wherein the instructions further configure the apparatus to: obtain a record of actions taken by the security personnel while responding to the security incident; determine the correct response to the security incident based on the record of actions taken by the security personnel, when the feedback indicates that the follow-on action that is signaled to the security personnel is not the correct response to the security incident; and include the correct response to the security incident in the feedback.

In some aspects, the techniques described herein relate to an apparatus, wherein the instructions further configure the apparatus to: determine that the correct response to the security incident is the follow-on action that is signaled to the security personnel, when the feedback indicates that the follow-on action that is signaled to the security personnel is the correct response to the security incident.

In some aspects, the techniques described herein relate to an apparatus, wherein the instructions further configure the apparatus to: detect the security incident based on one or more of: a vulnerability scan of a network and generating scan data, the scan data including data on which detection of the security incident was based, and the scan data including network scan data; an authenticated network scan data; vulnerability and asset assessment data, configuration data; signal captured at endpoints and/or networks; statistical profiling of network traffic; file operations at endpoints; malicious email; or threat intelligence data, wherein the security data applied to the machine-learning model includes the scan data.

In some aspects, the techniques described herein relate to an apparatus, wherein the instructions further configure the apparatus to: collect, after detecting the security incident, additional data that is determined to be relevant to the security incident, the additional data including ongoing incident response data, telemetry, log data, traffic data, or metadata, wherein the security data applied to the machine-learning model includes the additional data.

In some aspects, the techniques described herein relate to a computing apparatus, wherein the machine-learning model has been trained to use correlations between the scan data and the additional data to predict the follow-on action based on patterns in the scan data.

In some aspects, the techniques described herein relate to an apparatus, wherein: the follow-on action includes a decision tree having one or more branches at which the security personnel interacts with the network resulting in additional information about the security incident, and the instructions further configure the apparatus to: apply the additional information together with the security data to the machine-learning model to determine another follow-on action in response to the security incident, signal the another follow-on action to security personnel, receive another feedback from the security personnel, the another feedback including indicia whether the another follow-on action is the correct response to the security incident, and generate reinforcement training data based on the another feedback.

In some aspects, the techniques described herein relate to a computing apparatus, wherein the instructions cause the apparatus to signal the follow-on action to the security personnel by configuring the apparatus to: rank two or more follow-on actions and assigning respective scores corresponding to likelihoods that the two or more follow-on actions are the correct response to the security incident, and display to the security personnel a ranked list of the two or more follow-on actions and/or the two or more follow-on actions with the respective scores.

In some aspects, the techniques described herein relate to an apparatus, wherein the instructions further configure the apparatus to: determine a label based on the feedback; and associate the label with the follow-on action and the security data to generate the reinforcement training data.

In some aspects, the techniques described herein relate to a non-transitory computer-readable storage medium, the computer-readable storage medium including instructions that when executed by a computer, cause the computer to: receive an indication of a security incident and receiving security data corresponding to the security incident; apply the security data to a machine-learning model to determine a follow-on action in response to the security incident; signal the follow-on action to security personnel; receive feedback from the security personnel, the feedback including indicia whether the follow-on action is a correct response to the security incident; generate reinforcement training data based on the feedback; and train the machine-learning model using the reinforcement training data to perform reinforcement learning on the machine-learning model.

In some aspects, the techniques described herein relate to a non-transitory computer-readable storage medium, wherein: the machine-learning model is an artificial neural network in which weighting coefficients between respective layers are used to combine values of nodes at a layer to generate values at nodes of a subsequent layer in the, training the machine-learning model by using the reinforcement training data includes adjusting the weighting coefficients between one or more layers of the artificial neural network to minimize a loss function representing in part a difference or a proximity between the correct response to the security incident and an output of the machine-learning model in response to applying the security data, wherein the correct response to the security incident is based on the feedback.

In some aspects, the techniques described herein relate to a non-transitory computer-readable storage medium, wherein training the machine-learning model by using the reinforcement training data includes fine tuning the machine-learning model by unfreezing a subset of coefficients of the machine-learning model and optimizing a loss function between the correct response to the security incident and an output of the machine-learning model in response to applying the security data.

In some aspects, the techniques described herein relate to a non-transitory computer-readable storage medium, wherein the instructions further cause the computer to: obtain a record of actions taken by the security personnel while responding to the security incident; determine the correct response to the security incident based on the record of actions taken by the security personnel, when the feedback indicates that the follow-on action that is signaled to the security personnel is not the correct response to the security incident; and include the correct response to the security incident in the feedback.

In some aspects, the techniques described herein relate to a non-transitory computer-readable storage medium, wherein the instructions further cause the computer to: determine that the correct response to the security incident is the follow-on action that is signaled to the security personnel, when the feedback indicates that the follow-on action that is signaled to the security personnel is the correct response to the security incident.

In some aspects, the techniques described herein relate to a non-transitory computer-readable storage medium, wherein the instructions further cause the computer to: detect the security incident based on a vulnerability scan of a network and generating scan data, the scan data including data on which detection of the security incident was based, and the scan data including network scan data, an authenticated network scan data, vulnerability and asset assessment data, configuration data, or threat intelligence data, wherein the security data applied to the machine-learning model includes the scan data In some aspects, the techniques described herein relate to a non-transitory computer-readable storage medium, wherein the instructions further cause the computer to: collect, after detecting the security incident, additional data that is determined to be relevant to the security incident, the additional data including ongoing incident response data, telemetry, log data, traffic data, or metadata, wherein the security data applied to the machine-learning model includes the additional data.

In some aspects, the techniques described herein relate to a non-transitory computer-readable storage medium, wherein the machine-learning model has been trained to use correlations between the scan data and the additional data to predict the follow-on action based on patterns in the scan data.

In some aspects, the techniques described herein relate to a non-transitory computer-readable storage medium, wherein: the follow-on action includes a decision tree having one or more branches at which the security personnel interacts with the network resulting in additional information about the security incident, and the instructions further cause the computer to: apply the additional information together with the security data to the machine-learning model to determine another follow-on action in response to the security incident, signal the another follow-on action to security personnel, receive another feedback from the security personnel, the another feedback including indicia whether the another follow-on action is the correct response to the security incident, and generate reinforcement training data based on the another feedback.

In some aspects, the techniques described herein relate to a non-transitory computer-readable storage medium, wherein the instructions further cause the computer to: signal the follow-on action to the security personnel further by ranking two or more follow-on actions and assigning respective scores corresponding to likelihoods that the two or more follow-on actions are the correct response to the security incident, and cause a display to display to the security personnel a ranked list of the two or more follow-on actions and/or the two or more follow-on actions with the respective scores.

In some aspects, the techniques described herein relate to a non-transitory computer-readable storage medium, wherein the instructions further cause the computer to: determine a label based on the feedback; and associate the label with the follow-on action and the security data to generate the reinforcement training data.

Example Embodiments

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

The disclosed technology addresses the need in the art to provide Security Operation Center (SOC) personnel with guidance regarding follow-on actions in response to detection incidents.

When presented with the detection of a possible security incident, SOC personnel are asked to decide which follow-on actions to take in response. The SOC is tasked with properly evaluating detections/incidents, distinguishing whether the detected incidents are false positives or true positives, and, when they are true positives, determining appropriate remediating actions. When presented with a possible security incident, the SOC can choose, e.g., to take immediate remediating action (e.g., quarantine one or more servers), dismiss the incident as not posing a threat, create a ticket to review the incident, select a priority level for the incident within a queue of incidents, etc.

Classifying, triaging, and responding to security incidents is a largely manual process in the security industry. The number of security professionals with expertise in performing classification and triaging of vulnerabilities has not been able to keep up with the proliferation of vulnerabilities. Consequently, there is a need for more efficient methods for the classification and triaging of software vulnerabilities to make security professionals better able to fulfill the demand.

The responsibility of a Security Operations Center (SOC) is to rapidly detect, prioritize, and triage potential attacks. In these operations, the SOC is presented with detections/incidents and decides next steps to respond to these incidents (e.g., eliminating false positives and focusing on real attacks to carry out various follow-on actions). Taking the best follow-on actions promptly can help the SOC to reduce the average time to remediate incidents.

According to certain non-limiting examples, a machine-learning (ML) model can analyze and correlate security data of the incident from different sources to recommend follow-on actions.

Consider the non-limiting example in which the ML model is a large language model (LLM). The LLM can be trained using training data that includes a body of user interaction data with vulnerability scanner outputs. Examples of such training data can be CISCO's "Kenna Security™" data, CISCO's "SecureX™" data, and (CISCO XDR™" data, The LLM model can be applied like a multi-modal decision tree that accounts for a large number of parameters (both known and unknown).

The training data can be the same type of data as the incident data that will be used as the input to the trained LLM (e.g., data from a network scan, an authenticated network scan, or another technology that detected the vulnerability). And this training data can be labeled with human-generated follow-on actions. Thus, the LLM will learn to classify incidents based on the incoming incident data and generate follow-on actions consistent with patterns learned from the training data. Applying the LLM to future incidents will enable SOC practitioners to quickly triage the incidents and automatically have guidance regarding which follow-on actions to pursue.

The LLM will continuously learn from human feedback through ongoing reinforcement learning based on the human feedback. Often follow-on actions generated by the LLM will be correct, and a human performing the follow-on actions can signal as such. Sometimes, however, the follow-on actions generated by the LLM will not be the correct follow-on actions. In such a case, a human will review the incident and correct what the follow-on actions should have been. Both types of human-generated feedback (i.e., corrections to the LLM output and signal when the output from the LLM was correct) can be used for reinforcement learning. Reinforcement learning can help the LLM model improve over time, and can also help the LLM model stay current.

Using an LLM enables various types of data (both structured and unstructured) to be used as the input to the LLM. For example, various types of telemetry, log data, traffic data, metadata, etc. can be used as the input.

FIG. 1 illustrates system 100 to support security personnel who are presented with a possible security incident. System 100 helps security personnel by recommending one or more actions for responding to the possible security incident. The one or more recommended actions are determined by applying the security data 112 to a machine-learning model (i.e., ML model 114) which uses the context provided by the security data 112 to predict the best actions to address the security incident based on what has been done in similar scenarios in the past and the threat intelligence provided by security data 112.

According to certain non-limiting examples, system 100 includes scan processor 102 which scans a network for possible security incidents. When a possible security incident is detected, scan processor 102 generates incident signal 106. Additionally, scan processor 102 outputs scan data 104, which includes data from a network scan and possibly other data that was relied on for inferring the security incident. After detecting a possible security incident, incident signal 106 can trigger additional data collector 108 to collect other data that may be relevant to the security incident and provide additional data 110 to ML model 114.

ML model 114 receives security data 112 as an input, and, in response, ML model 114 generates follow-on action(s) 116. Security data 112 is a combination of scan data 104, incident signal 106, and additional data 110. For example, ML model 114 can be an artificial neural network (ANN) that has been trained to predict, based on all available information, the best action follow-on action(s) 116 for responding to a security incident. The action follow-on action(s) 116 can be presented to security personnel response using a graphical user interface (e.g., UI 118). UI 118 can also monitor the response of the security personnel to generate user feedback 120, which is then used by reinforcement learning processor 122 to perform reinforcement learning, generating updated ML coefficients 124 to improve and fine-tune ML model 114.

According to certain non-limiting examples, the follow-on action(s) 116 can occur in an iterative manner. For example, one of follow-on action(s) 116 can include executing a particular test/scan on a part of the network that is suspected of being compromised to generate test data. This test data can provide important context that helps to narrow the possible causes of the security incident. In FIG. 1, UI 118 can receive user inputs (e.g., the security personnel can enter into UI 118 an instruction to execute a particular test/scan), Then, follow-on action processor 126 performs the actions indicated by the user inputs, generating a result (e.g., the test data) that, when applied to ML model 114) helps ML model 114 better predict the best response actions to remediate the security incident.

According to certain non-limiting examples, ML model 114 can be a large language model (LLM) which has been trained to receive incident data for security incidents/detections. The LLM then classifies the incidents/detections and determines follow-on actions, which are presented to security personnel as recommendations for addressing/remediating the incident. Using the trained LLM to recommend follow-on actions can enable the Security Operation Center (SOC) to timely triage and remediate a high volume of security incidents/detections.

According to certain non-limiting examples, ML model 114 can include an (LLM) which has been trained using training data including user interaction data with vulnerability scanner outputs. Here, a user can be security personnel from an SOC. For example, response by security personnel to threat detections signaled by extended detection and response (XDR) systems, endpoint detection and response (EDR) systems, network detection and response (NDR) systems, and security information and event management (SIEM) tools can be recorded and associated with the relevant data that was used to detect the threats. This record can be used as training data to predict the correct response based on the relevant data.

For example, the LLM model can function as a multi-modal decision tree that accounts for a large number of parameters (both known and unknown). For example, the decision tree can be a graph that branches out with various response actions. One branch can include deciding whether to label the detection/incident as a false positive and do nothing more. When the detection/incident is not determined to be false positive, the decision tree can bifurcate at various other decision/classification points leading to responses that are available to security personnel when encountering insecure acts (e.g., executing a specified playbook, following a flow diagram, referring the security personnel to examples, tutorials, key investigative leads, etc.) Further, the follow-on actions suggested by ML model 114 can include create a service ticket and/or referring the security incident for human analysis (e.g., when the predicted best response actions from ML model 114 have a predicted likelihood score below a confidence threshold).

According to certain non-limiting examples, the training data is the same type of data as the incident data that will be used as the input to the trained LLM. For example, when security data 112 applied to ML model 114 is from a network scan, an authenticated network scan, or another technology that detected the vulnerability, then the input data in the training data will also be from a network scan, an authenticated network scan, or another technology that detected the vulnerability. Further, the training data can be labeled with human-generated follow-on actions, such that supervised learning can be used to train ML model 114 as described below with reference to FIG. 4A. When the ML model 114 includes an ANN, for example, a back projection algorithm can be used to train ML model 114 using labeled training data and a loss function representing the proximity (e.g., calculated using a distance metric, such as the Euclidean distance) between the predicted follow-on action(s) 116 from ML model 114 and the human-generated follow-on actions in the training data. The LLM can learn to classify incidents based on the incoming incident data (i.e., security data 112) and generate follow-on actions consistent with patterns learned from the training data. Once trained, ML model 114 enables SOC practitioners to quickly triage security incidents and provide guidance regarding which follow-on actions to pursue.

According to certain non-limiting examples, reinforcement learning enables ML model 114 to improve and to evolve and adapt to new threats and incorporate current best practices for security personnel. For example, ML model 114 can continuously learn from human feedback through ongoing reinforcement learning. Often follow-on action(s) 116 are correct, and a human performing the follow-on actions can signal as such, resulting in user feedback 120.

Other times, follow-on action(s) 116 will not be the correct follow-on actions. In such a case, security personnel reviewing the incident can perform the correct follow-on actions resulting in user feedback 120. Both types of user feedback 120 (i.e., corrections to follow-on action(s) 116 and signal when the output from ML model 114 was correct) can be used for reinforcement learning. Reinforcement learning can help ML model 114 improve over time and can also help ML model 114 stay current.

For example, in many cases the detection of a possible security incident can be a false positive, and Security Operations Center (SOC) personnel can confirm that it is a false positive by verifying a few key pieces of information or executing a standard script. Other cases might be more complex, and ML model 114 can recommend a playbook having one or more actions to confirm that the possible security incident is a true positive and what remediating action to take when the possible security incident is confirmed to be a true positive.

These actions recommended by ML model 114 are follow-on action(s) 116, which are presented/displayed to the security personnel via a user interface (i.e., UI 118). By monitoring the security personnel's response to the security incident and follow-on action(s) 116 recommended by ML model 114, UI 118 generated user feedback 120, which can be used for reinforcement learning. Because new security threats continue to be developed by bad actors and the technology and techniques for combating new and existing security threats evolve, ML model 114 can also evolve to remain current by evolving to recommended follow-on action(s) 116 that are consistent with current best practices and by evolving to combat techniques used by bad actors to obfuscate and mask security threats. Thus, even though the security threats evolve, ML model 114 is still able to discriminate which particular security threat is indicated by the threat's signatures in the security data 112 to thereby recommend the remediating action for that particular security threat.

ML model 114 evolves using reinforcement learning. UI 118 can monitor what actions the security personnel performs in response to the security incident to generate a record of the security personnel's response. UI 118 then generates user feedback 120 based on the security personnel's response, and reinforcement training data based on user feedback 120 is used for reinforcement learning. In reinforcement learning, reinforcement learning processor 122 modifies or fine-tunes ML model 114 to generate follow-on action(s) 116 consistent with the reinforcement training data, in addition to the original training data. For example, the coefficients of ML model 114 can be adjusted to minimize a loss function based on a combination of the reinforcement training data derived from user feedback 120 and the training data that was used to originally train ML model 114. According to certain non-limiting examples, the loss function can weight the reinforcement training data differently than the original training data. For example, the loss function can emphasize contributions from the reinforcement training data to encourage 114 to adapt to changes in the threat landscape and improvements in techniques for remediating security threats.

Figure 2:
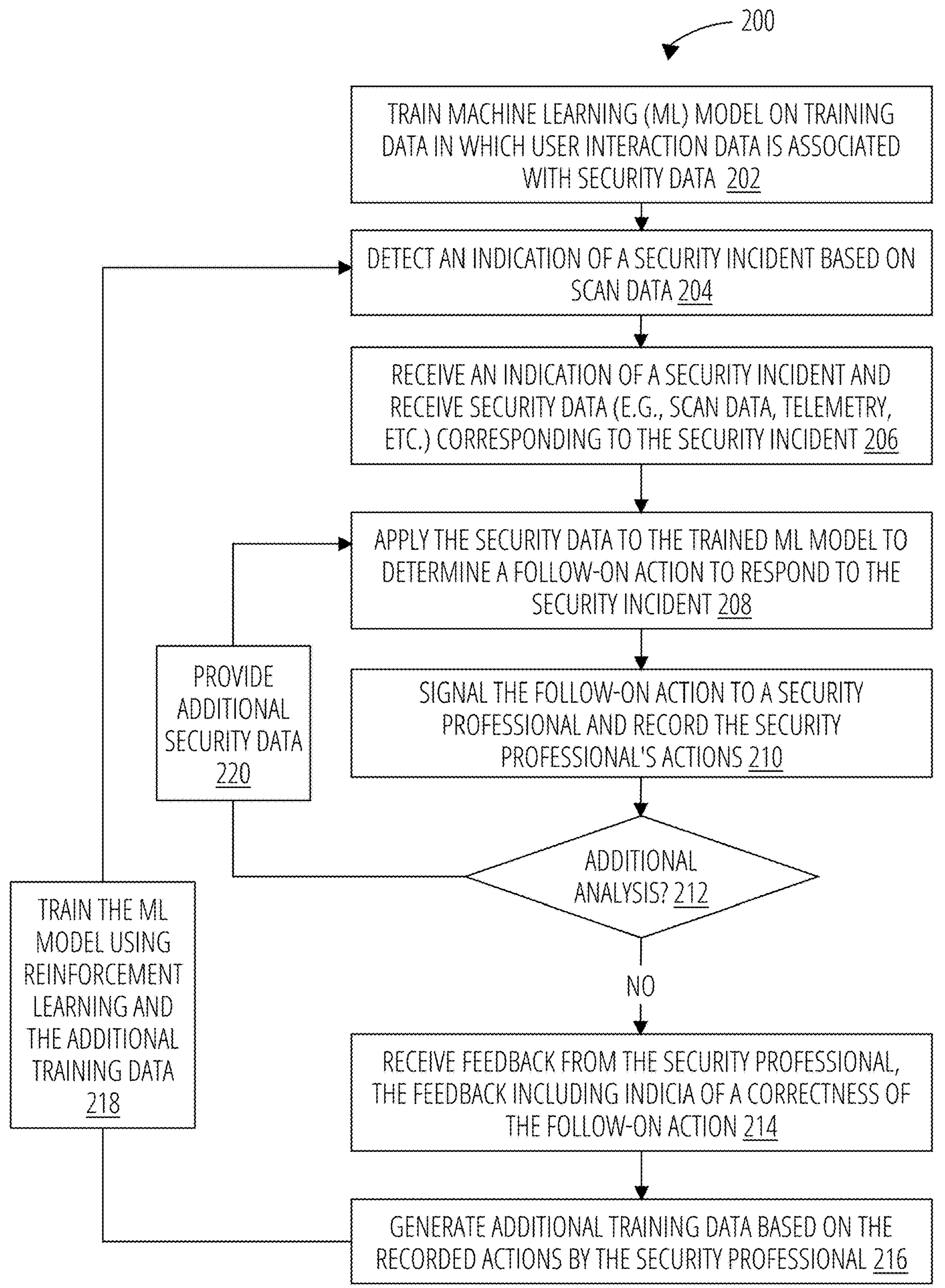
FIG. 2 illustrates a flow diagram for an example of a method for recommending follow-on actions when responding to a possible security incident, in accordance with certain embodiments.

FIG. 2 illustrates an example method 200 using a machine-learning (ML) model such as a large language model (LLM) to recommend follow-on actions in response to the detection of a security incident Although the example method 200 depicts a particular sequence of operations, the sequence may be altered without departing from the scope of the present disclosure. For example, some of the operations depicted may be performed in parallel or in a different sequence that does not materially affect the function of the method 200. In other examples, different components of an example device or system that implements the method 200 may perform functions at substantially the same time or in a specific sequence.

Method 200 can aid a Security Operations Center (SOC) to rapidly detect, prioritize, and triage potential attacks. In these operations, the SOC is presented with detections/incidents and has to decide what steps to take to respond to these incidents (e.g., eliminating false positives and focusing on real attacks to carry out various follow-on actions). Using ML model 114 to recommend follow-on action(s) 116 can help the SOC to reduce the average time to remediate incidents.

According to some examples, in step 202, the method includes training machine-learning (ML) model on training data. For example, the training data can be labeled training data that is used for supervised learning. That is, the training data can include security data labeled with human-generated follow-on actions, such that human-generated follow-on actions for a historical security incident are associated with security data for that historical security incident. Step 202 can train ML model 114 in FIG. 1, for example.

According to certain non-limiting examples, the machine-learning model can be an artificial neural network in which weighting coefficients between respective layers are used to combine values of nodes at a layer to generate values at nodes of a subsequent layer in the artificial neural network. Training the ML model can includes adjusting the weighting coefficients between one or more layers of the artificial neural network to minimize a loss function representing a difference/proximity between the human-generated follow-on actions and an output of the machine-learning model in response to applying the security data.

According to certain non-limiting examples, the training data is the same type of data as the security data that is used as the input to the trained LLM. For example, when security data 112 applied to ML model 114 is from a network scan, an authenticated network scan, or another technology that detected the vulnerability, then the input data in the training data will also be from a network scan, an authenticated network scan, or another technology that detected the vulnerability. Further, the training data can be labeled with human-generated follow-on actions, such that supervised learning can be used to train ML model 114 as described below with reference to FIG. 4A.

According to certain non-limiting examples, ML model 114 is multi-modal, such that it can receive different types of inputs. For example, in addition to receiving text and alphanumeric inputs, ML model 114 can receive images such as a screen capture showing information related to the security incident. In this case, ML model 114 can interpret and use the screen capture (and possibly other types of inputs) to classify the security incident and generate follow-on action(s) 116.

When the ML model 114 includes an ANN, for example, a back projection algorithm can be used to train ML model 114 using labeled training data and a loss function representing the proximity (e.g., calculated using a distance metric, such as the Euclidean distance) between the predicted follow-on action(s) 116 from ML model 114 and the human-generated follow-on actions in the training data. The LLM can learn to classify incidents based on the incoming incident data (i.e., security data 112) and generate follow-on actions consistent with patterns learned from the training data. Once trained, ML model 114 enables security personnel to quickly triage security incidents and provide guidance regarding which follow-on actions to pursue.

According to some examples, in step 204, the method includes detecting a security incident based on scan data. For example, a scan of the network can be performed in which scan data is analyzed to detect anomalies or other indicia of a possible security incident. The scan data can be, e.g., data from a network scan, an authenticated network scan, or another technology that detected the vulnerability. Step 204 can be performed, e.g., by scan processor 102 in FIG. 1, and step 204 can be performed using the techniques and processes described with reference to scan processor 102.

According to certain non-limiting examples, step 204 can include detecting the security incident based on a vulnerability scan of a network and generating scan data, and the scan data can include data on which detection of the security incident was based, and the scan data including network scan data, an authenticated network scan data. The security incident can also be detected based on one or more of vulnerability and asset assessment data; configuration data; signal captured at endpoints and/or networks; statistical profiling of network traffic; file operations at endpoints; malicious email; or threat intelligence data.

For example, a scan be performed by a vulnerability scanner that assess computers, networks or applications for known weaknesses. These scanners are used to discover the weaknesses of a given system. For example, the vulnerability scanner can detect and identify vulnerabilities arising from misconfiguration or flawed programming within a network-based asset such as a firewall, router, web server, and/or application server. Authenticated scans allow for a scanner to directly access network-based assets using remote administrative protocols and using system credentials, thereby allowing access low-level data, such as specific services and configuration details of the host operating system. The scanner can provide detailed and accurate information about the operating system and installed software, including configuration issues and missing security patches. In contrast, unauthenticated scans can have a higher number of false positives due to the inability to provide detailed information about the assets operating system and installed software. Nevertheless, unauthenticated scans can be quicker and using fewer resources, and the absence of credentials means that unauthenticated scans pose fewer risks to the stability of the system due to inadvertent changes.

According to some examples, in step 206, the method includes receiving an indication of a security incident and receiving security data (e.g., scan data, telemetry, etc.) corresponding to the security incident. Receiving the security data can include collecting scan data and additional data. The scan data can be collected before the detection of the security incident, and the additional data can be collected after the detection of the security incident. Step 206 can be performed, e.g., by additional data collector 108 in FIG. 1, and this step can be performed using the techniques and processes described with reference to additional data collector 108.

According to certain non-limiting examples, step 204 can include, after detecting the security incident, collecting additional data that is determined to be relevant to the security incident, and the additional data can include ongoing incident response data, telemetry, log data, traffic data, or metadata. Additional data 110 can be collected from various systems across the network including data from endpoint, network, firewall, email, identity, and DNS systems to provide a comprehensive view of the network systems.

According to certain non-limiting examples, the security data, which is collected to be used as an input to ML model 114, can include scan data 104 and additional data 110, as described with reference to FIG. 1.

According to certain non-limiting examples, scan data 104 received in step 206 can include data that was used in detecting the security incident based on a vulnerability scan. For example, scan data 104 can include data on which the detection of the security incident was based, such as network scan data, authenticated network scan data, vulnerability and asset assessment data, configuration data, or threat intelligence data.

According to certain non-limiting examples, additional data 110 received in step 206 can include data that was collected after the detection of the security incident. For example, step 206 can include collecting, after detecting the security incident, additional data that is determined to be relevant to the security incident, the additional data including ongoing incident response data, telemetry, log data, traffic data, threat intelligence data, or metadata.

Threat intelligence data can include private/proprietary data about vulnerabilities, such as MANDIANT and TALOS threat intelligence data sets. Threat intelligence data can include source code of the vulnerability, assembly code of the exploits, reverse engineering notes/comments regarding the code of the exploits; indicators of compromise (IoC); indicators of Attack (IoA); published CVEs, security-related blogs, reports, whitepapers, etc.; various types of telemetry data from attacks; and the like. Threat intelligence data can include publicly available information regarding a vulnerability, such as a CVE description, vulnerability reports, and, when available, publicly available scores from service providers (e.g., scores for managed security service providers (MSSPs), such as the exploit prediction scoring system (EPSS). Additionally or alternatively, the threat intelligence can include telemetry of one or more attacks on the vulnerability and source code or assembly code (e.g., source code of for the vulnerability and assembly code of the exploit from the one or more attacks). Threat intelligence can also include information about the method of exploitation about various software vulnerabilities, including, e.g., information based on the MITRE ATT&CK tactics and techniques, STRIDE threat classifications, vulnerability types, exploitation methodologies, exploitation entry points, and/or common vulnerability scoring system (CVSS), vectors.

Ongoing incident response data can include data received from XDR, EDR, NDR, SIEM, and/or SOAR systems, for example. Further, ongoing incident response data can include results for deep packet inspection, anomaly detection, behavioral graph analysis, etc.

According to some examples, in step 208, the method includes applying the security data to the trained ML model to determine a follow-on action to respond to the security incident. Step 208 can be performed, e.g., by ML model 114 in FIG. 1, and this step can be performed using the techniques and processes described with reference to ML model 114.

According to some examples, in step 210, the method includes signaling the follow-on action to a security professional and recording the security professional's actions at step 210. Step 210 can be performed, e.g., using UI 118 in FIG. 1, and this step can be performed using the techniques and processes described with reference to UI 118.

According to some examples, in decision block 212, the method queries whether to perform additional analysis.

When it is determined to perform additional analysis the method returns to step 208 via step 220. Otherwise, method 200 continues to step 214.

According to some examples, in step 214, the method includes receiving feedback from the security professional for the follow-on actions. Further, in step 216, feedback based on the recorded actions by the security personnel are used to generate additional training data for reinforcement learning, and, in step 218, reinforcement learning is applied to ML model 114 is trained using the additional training data. Steps 214, 216, and 220 can be performed, e.g., by UI 118 and reinforcement learning processor 122 to generate updated ML coefficients 124 as illustrated in FIG. 1. Further, these steps can be performed using the techniques and processes described with reference to UI 118 and reinforcement learning processor 122.

For example, step 214 can include receiving feedback from security personnel, which includes indicia whether the follow-on action is a correct response to the security incident.

According to certain non-limiting examples, step 214 includes obtaining a record of actions taken by the security personnel while responding to the security incident. Then, the correct response to the security incident can be determined based on the record of actions taken by the security personnel. For example, when the feedback indicates that the follow-on action that is signaled to the security personnel is not the correct response to the security incident.

According to certain non-limiting examples, step 214 can include determining that the correct response to the security incident is the follow-on action that is signaled to the security personnel, when the feedback indicates that the follow-on action that is signaled to the security personnel is the correct response to the security incident.

According to certain non-limiting examples, step 216 includes generating additional training data (i.e., reinforcement training data) based on the recorded actions by the security professional.

According to certain non-limiting examples, the additional training data is labeled in which security data that was applied to ML model 114 is labeled with the correct follow-on actions, which is based on the recorded response by the security personnel, as discussed above for step 214. Like the training data discussed above, the additional training data is the same type of data as the incident data that will be used as the input to ML model 114 (e.g., data from a network scan, an authenticated network scan, or another technology that detected the vulnerability).

According to some examples, the method includes determining a label based on the feedback, and the label, which is the correct follow-on action is associated with the security data to generate labeled training data.

According to certain non-limiting examples, step 218 includes using the additional training data to further train ML model 114 using reinforcement learning. Reinforcement learning can be performed, e.g., whenever a predefined quantity of additional training data has accumulated. Further, reinforcement learning can be performed using additional training data collected from different SOCs and different security personnel. Reinforcement learning can be performed using the techniques and methods described for 122 in FIG. 1.

According to certain non-limiting examples, ML model 114 can be an artificial neural network in which weighting coefficients between respective layers are used to combine values of nodes at a layer to generate values at nodes of a subsequent layer in the artificial neural network. Reinforcement learning applied to ML model 114 can use the additional training data to adjust the weighting coefficients between one or more layers of the artificial neural network to minimize a loss function representing the difference between the training labels (e.g., the correct response to the security incident) and an output of ML model 114 in response to the training inputs (e.g., security data 112). According to certain non-limiting examples, reinforcement learning does not adjust all the weighting coefficients. Rather, only one or more layers are unfrozen and allowed to change during reinforcement learning.

According to certain non-limiting examples, the training of the ML model by using the additional training data includes fine-tuning the machine-learning model by unfreezing a subset of coefficients of the machine-learning model and optimizing a loss function between the correct response to the security incident and an output of the machine-learning model in response to applying the security data.

According to some examples, step 220 is part of an iterative loop in which the follow-on actions that are performed on the network generate additional data that provide more context for ML model 114 to recommend improved/additional follow-on actions.

For example, the follow-on action can include a decision tree having one or more branches at which the security personnel interact with the network, resulting in additional information about the security incident that can be useful to better classify the security incident as a particular type of threat or better locate the source for a threat and provide more concrete guidance for that particular type of threat or more concrete guidance where that threat is located (e.g., quarantine a particular server or particular host running on said server). In this case, it can be beneficial to loop back to step 208 via step 220 to provide the additional information generated from one or more follow-on actions to the ML model 114 and generate additional follow-on actions based on the original security data 112 and the additional information generated in response to the one or more follow-on actions. Step 220 can be performed, e.g., using follow-on action processor 126 in FIG. 1, and this step can be performed using the techniques and processes described with reference to follow-on action processor 126.

According to certain non-limiting examples, decision block 212 and the loop of step 220, step 208, and 210 can include generating additional information about the security incident by performing one or more follow-on actions in accordance with user inputs received from security personnel via UI 118. For example, the additional information can be generated by follow-on action processor 126. The loop can further include applying the additional information together with the security data to ML model 114 to determine other follow-on action(s) 116 for the security incident, and these other follow-on action(s) 116 can be signaled to the security personnel via UI 118. Further, additional feedback can be received from the security personnel. Like the initial feedback, the additional feedback can also be used for reinforcement learning.

Figure 3A:
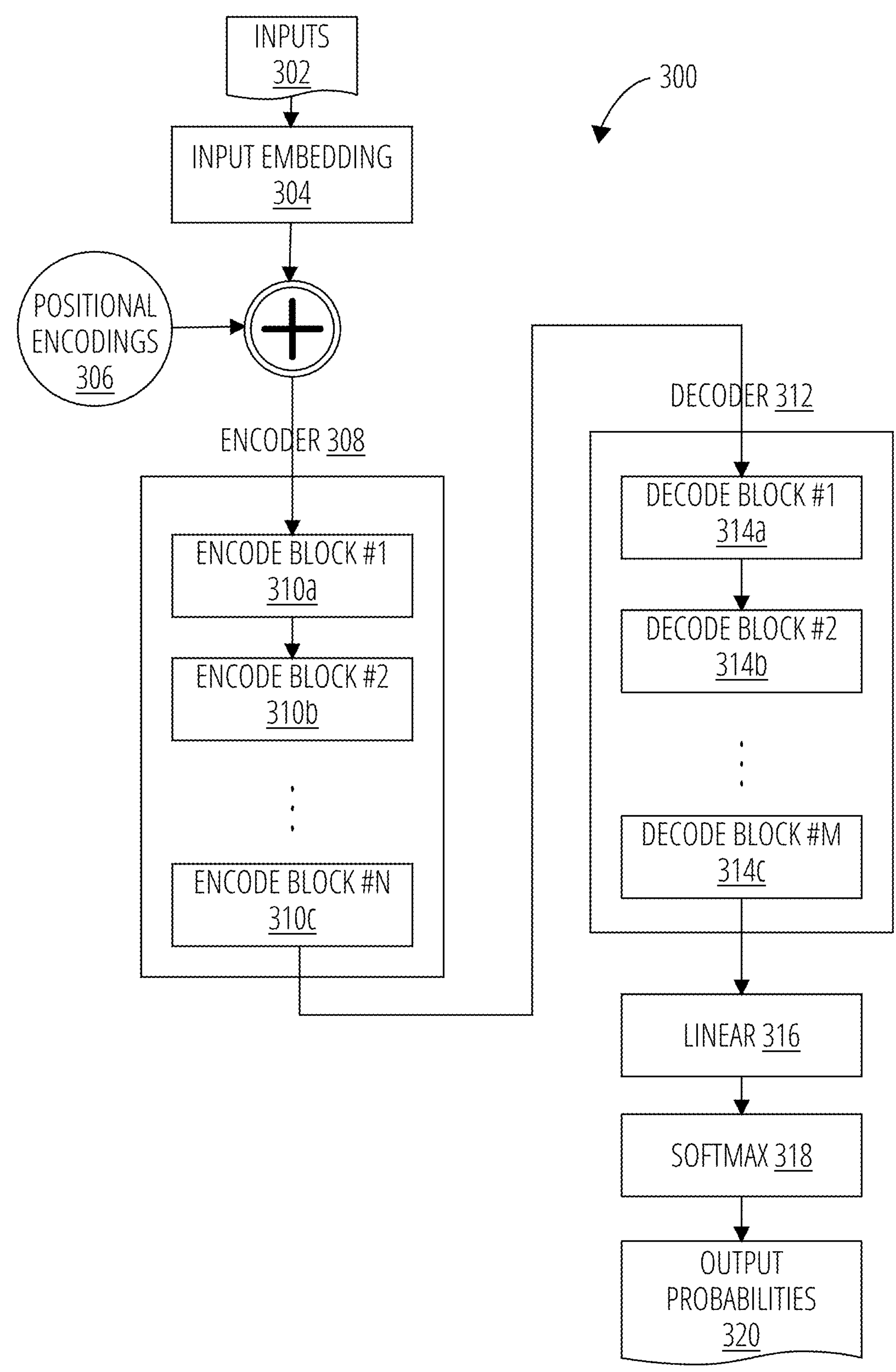
FIG. 3A illustrates a block diagram for an example of a transformer neural network architecture, in accordance with certain embodiments.
Figure 3B:
FIG. 3B illustrates a block diagram for an example of an encoder of the transformer neural network architecture, in accordance with certain embodiments.
Figure 3B:
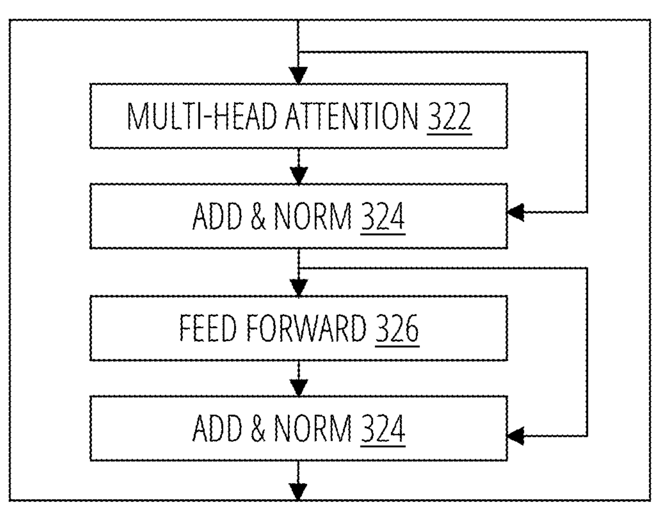
Figure 3C:
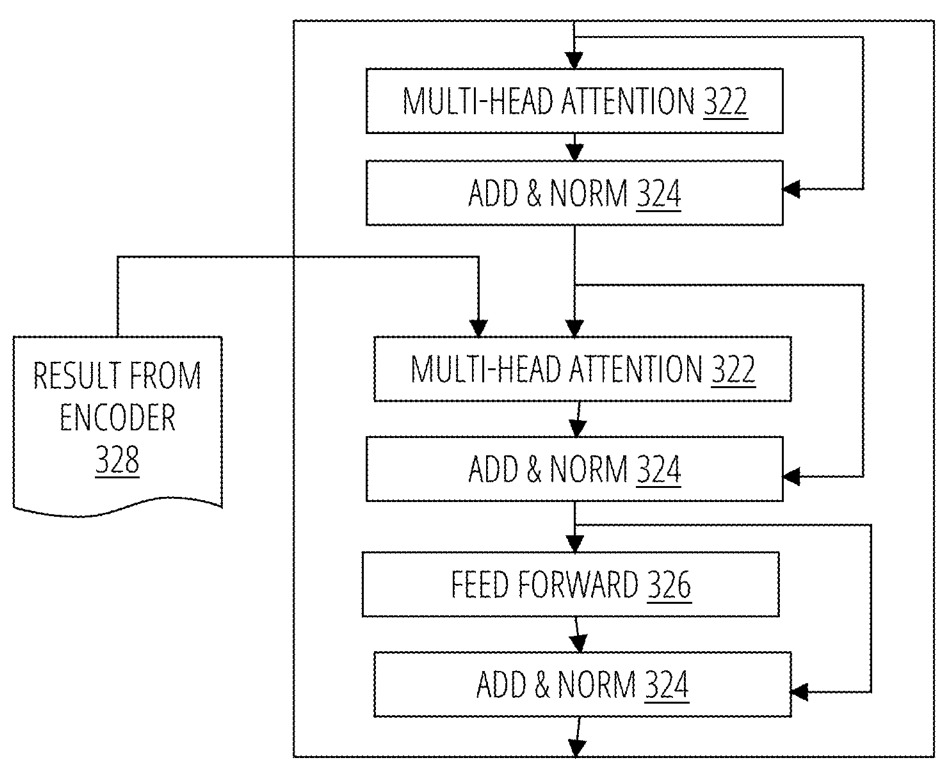
FIG. 3C illustrates a block diagram for an example of a decoder of the transformer neural network architecture, in accordance with certain embodiments.

As discussed above, ML model 114 can be an LLM, such as a transformer neural network. Examples of LLMs that are transformer neural network include, e.g., generative pre-trained transformer (GPT) models and Bidirectional Encoder Representations from Transformer (BERT) models. The transformer architecture 300, which is illustrated in FIG. 3A, FIG. 3B, and FIG. 3C, includes inputs 302, an input embedding block 304, positional encodings 306, an encoder 308 (e.g., encode block 310*a*, encode block 310*b*, and encode block 310*c*), a decoder 312 (e.g., decode block

314*a*, decode block 314*b*, and decode block 314*c*), a linear block 316, a softmax block 318, and an output probabilities 320.

The inputs 302 can include security data 112 conveying information about a security incident. The transformer architecture 300 can be used as a classifier to classify the security incident and determine follow-on actions for the security incident.

The input embedding block 304 is used to provide representations for words. For example, embedding can be used in text analysis. According to certain non-limiting examples, the representation is a real-valued vector that encodes the meaning of the word in such a way that words that are closer in the vector space are expected to be similar in meaning. Word embeddings can be obtained using language modeling and feature learning techniques, where words or phrases from the vocabulary are mapped to vectors of real numbers. According to certain non-limiting examples, the input embedding block 304 can be learned embeddings to convert the input tokens and output tokens to vectors of dimension have the same dimension as the positional encodings, for example.

The positional encodings 306 provide information about the relative or absolute position of the tokens in the sequence. According to certain non-limiting examples, the positional encodings 306 can be provided by adding positional encodings to the input embeddings at the inputs to the encoder 308 and decoder 312. The positional encodings have the same dimension as the embeddings, thereby enabling a summing of the embeddings with the positional encodings. There are several ways to realize the positional encodings, including learned and fixed. For example, sine and cosine functions having different frequencies can be used. That is, each dimension of the positional encoding corresponds to a sinusoid. Other techniques of conveying positional information can also be used, as would be understood by a person of ordinary skill in the art. For example, learned positional embeddings can instead be used to obtain similar results. An advantage of using sinusoidal positional encodings rather than learned positional encodings is that so doing allows the model to extrapolate to sequence lengths longer than the ones encountered during training.

The encoder 308 uses stacked self-attention and point-wise, fully connected layers. The encoder 308 can be a stack of N identical layers (e.g., N=6), and each layer is an encode block (e.g., encode block 310*a*, encode block 310*b*, and encode block 310*c*), as illustrated by encode block 310*a* shown in FIG. 3B. Each encode block has two sub-layers: (i) a first sub-layer has a multi-head attention block 322 and (ii) a second sub-layer has a feed forward block 326, which can be a position-wise fully connected feed-forward network. The feed forward block 326 can use a rectified linear unit (ReLU).

The encoder 308 uses a residual connection around each of the two sub-layers, followed by an add & norm block 324, which performs normalization (e.g., the output of each sub-layer is LayerNorm (x+Sublayer(x)), i.e., the product of a layer normalization "LayerNorm" time the sum of the input "x" and output "Sublayer(x)" pf the sublayer LayerNorm (x+Sublayer (x)), where Sublayer(x) is the function implemented by the sub-layer). To facilitate these residual connections, all sub-layers in the model, as well as the embedding layers, produce output data having a same dimension.

Similar to the encoder 308, the decoder 312 uses stacked self-attention and point-wise, fully connected layers. The decoder 312 can also be a stack of M identical layers (e.g., M=6), and each layer is a decode block (e.g., decode block 314*a*), as illustrated by decode block 314*a* shown in FIG. 3C. In addition to the two sub-layers (i.e., the sublayer with the multi-head attention block 322 and the sub-layer with the feed forward block 326) found in the encode block 310*a*, the decode block 314*a* can include a third sub-layer, which performs multi-head attention over the output of the encoder stack. Similar to the encoder 308, the decoder 312 uses residual connections around each of the sub-layers, followed by layer normalization. Additionally, the sub-layer with the multi-head attention block 322 can be modified in the decoder stack to prevent positions from attending to subsequent positions. The multi-head attention block 322 receives as inputs the results from encoder 328 and an out put from a decode block. This masking, combined with fact that the output embeddings are offset by one position, ensures that the predictions for position i can depend only on the known output data at positions less than i.

The linear block 316 can be a learned linear transformation. For example, when the transformer architecture 300 is being used to translate from a first language into a second language, the linear block 316 projects the output from the last decode block (e.g., decode block 314*c*) into word scores for the second language (e.g., a score value for each unique word in the target vocabulary) at each position in the sentence. For instance, if the output sentence has seven words and the provided vocabulary for the second language has 10,000 unique words, then 10,000 score values are generated for each of those seven words. The score values indicate the likelihood of occurrence for each word in the vocabulary in that position of the sentence.

The softmax block 318 then turns the scores from the linear block 316 into output probabilities 320 (which add up to 1.0). In each position, the index provides for the word with the highest probability, and then map that index to the corresponding word in the vocabulary. Those words then form the output sequence of the transformer architecture 300. The softmax operation is applied to the output from the linear block 316 to convert the raw numbers into the output probabilities 320 (e.g., token probabilities).

Although the above example uses the case of translating from the first language to the second language to illustrate the functions of the transformer architecture 300, the output probabilities 320 can be other entities, such as probabilities for the follow-on action(s) 116. The transformer architecture 300 can generate output probabilities 320 related to whether the security incident is false positive and the follow-on action is to dismiss it, or probabilities regarding which other response actions should be taken (e.g., executing a specified playbook, following a flow diagram, referring the security personnel to examples, tutorials, key investigative leads, etc.)

Generally, the transformer architecture 300 can generate output probabilities 320 related to the follow-on action(s) 116 to provide security personnel with guidance regarding the security incident and how it might be remediated.

Figure 4A:
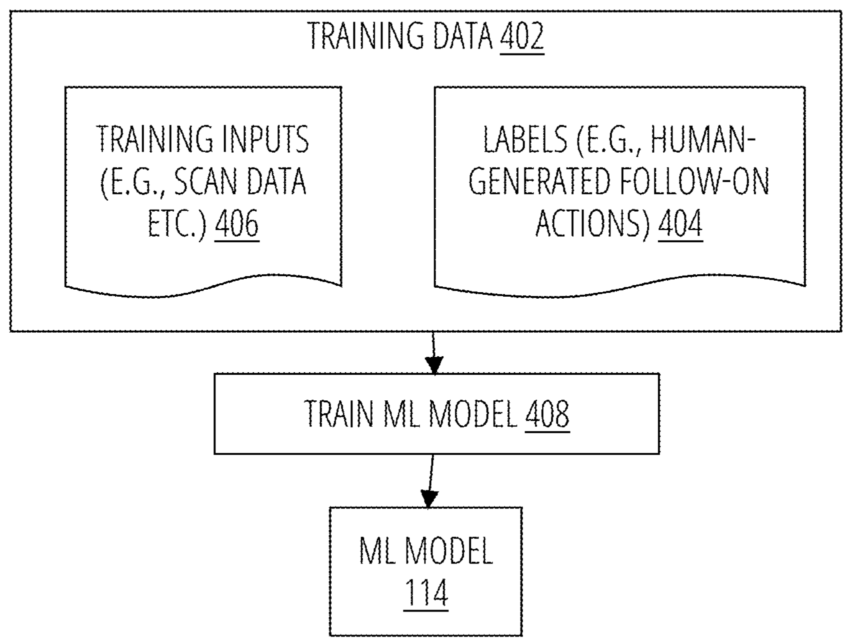
FIG. 4A illustrates a flow diagram for an example of a method of training a machine-learning (ML) model, in accordance with certain embodiments.

FIG. 4A illustrates an example of training ML model 114. In step 408, training data 402, which includes training labels 404 and training inputs 406, is applied to train ML model 114. For example, ML model 114 can be an artificial neural network (ANN) that is trained via supervised learning using a backpropagation technique to train the weighting parameters connecting nodes in one layer of the ANN to nodes of the next layers of the ANN. Alternatively, ML model 114 can be trained via unsupervised learning.

In supervised learning, the training data 402 is applied as an input to ML model 114, and an error/loss function is generated by comparing the output from ML model 114 with training labels 404 (e.g., human-generated follow-on actions). The coefficients of ML model 114 are iteratively updated to reduce the error/loss function. The value of the error/loss function decreases as outputs from ML model 114 increasingly approximate the training labels (e.g., training labels 404). In other words, ANN infers the mapping implied by the training data, and the error/loss function produces an error value related to the mismatch between training labels 404 and the outputs from ML model 114 that are produced as a result of applying training inputs 406 to ML model 114.

Alternatively, for unsupervised learning or semi-supervised learning, training data 402 is applied to train ML model 114. For example, ML model 114 can be an artificial neural network (ANN) that is trained via unsupervised or self-supervised learning.

The advantage of the transformer architecture 300 is that it can be trained through self-supervised learning or unsupervised methods. The Bidirectional Encoder Representations from Transformer (BERT), for example, does much of its training by taking large corpora of unlabeled text, masking parts of it, and trying to predict the missing parts. It then tunes its parameters based on how much its predictions were close to or far from the actual data. By continuously going through this process, the transformer architecture 300 captures the statistical relations between different words in different contexts. After this pretraining phase, the transformer architecture 300 can be finetuned for a downstream task such as question answering, text summarization, or sentiment analysis by training it on a small number of labeled examples.

In unsupervised learning, the training data 402 is applied as an input to ML model 114, and an error/loss function is generated by comparing a prediction to a known value from the training data. The coefficients of ML model 114 can be iteratively updated to reduce an error/loss function. The value of the error/loss function decreases as outputs from ML model 114 increasingly approximate the training data 402.

For example, in certain implementations, the cost function can use the mean-squared error to minimize the average squared error. In the case of a of multilayer perceptrons (MLP) neural network, the backpropagation algorithm can be used for training the network by minimizing the mean-squared-error-based cost function using a gradient descent method.

Training a neural network model essentially means selecting one model from the set of allowed models (or, in a Bayesian framework, determining a distribution over the set of allowed models) that minimizes the cost criterion (i.e., the error value calculated using the error/loss function). Generally, the ANN can be trained using any of numerous algorithms for training neural network models (e.g., by applying optimization theory and statistical estimation).

For example, the optimization method used in training artificial neural networks can use some form of gradient descent, using backpropagation to compute the actual gradients. This is done by taking the derivative of the cost function with respect to the network parameters and then changing those parameters in a gradient-related direction. The backpropagation training algorithm can be: a steepest descent method (e.g., with variable learning rate, with variable learning rate and momentum, and resilient backpropagation), a quasi-Newton method (e.g., Broyden-Fletcher-Goldfarb-Shannon, one step secant, and Levenberg-Marquardt), or a conjugate gradient method (e.g., Fletcher-Reeves update, Polak-Ribiére update, Powell-Beale restart, and scaled conjugate gradient). Additionally, evolutionary methods, such as gene expression programming, simulated annealing, expectation-maximization, non-parametric methods, and particle swarm optimization, can also be used for training ML model 114.

The training data 402 of step 408 of ML model 114 can also include various techniques to prevent overfitting to the training data 402 and for validating the trained ML model 114. For example, bootstrapping and random sampling of the training data 402 can be used during training.

In addition to supervised learning used to initially train ML model 114, ML model 114 can be continuously trained while being used by using reinforcement learning based on user feedback 120.

Further, other machine learning (ML) algorithms can be used for ML model 114, and ML model 114 is not limited to being an ANN. For example, there are many machine-learning models, and ML model 114 can be based on machine-learning systems that include generative adversarial networks (GANs) that are trained, for example, using pairs of network measurements and their corresponding optimized configurations.

As understood by those of skill in the art, machine-learning based classification techniques can vary depending on the desired implementation. For example, machine-learning classification schemes can utilize one or more of the following, alone or in combination: hidden Markov models, recurrent neural networks (RNNs), convolutional neural networks (CNNs); Deep Learning networks, Bayesian symbolic methods, general adversarial networks (GANs), support vector machines, image registration methods, and/or applicable rule-based systems. Where regression algorithms are used, they can include but are not limited to: a Stochastic Gradient Descent Regressors, and/or Passive Aggressive Regressors, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Figure 4B:
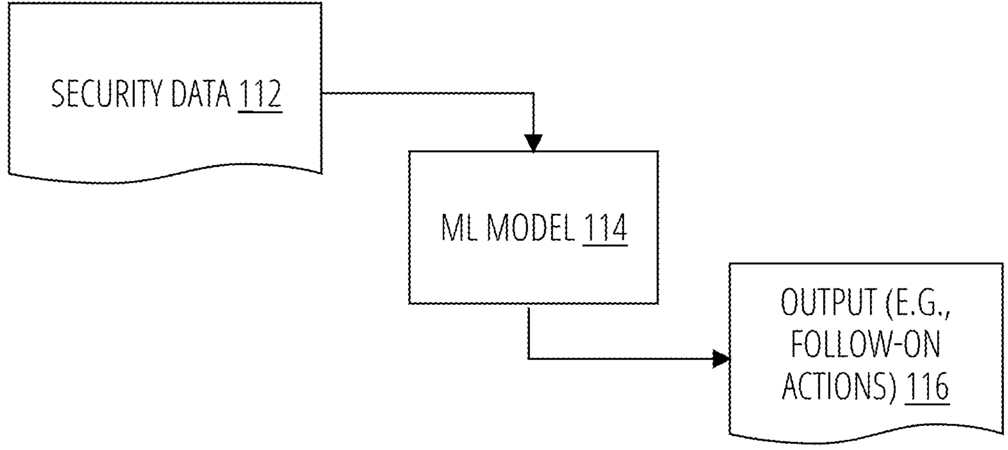
FIG. 4B illustrates a flow diagram for an example of a method of using the trained ML) model, in accordance with certain embodiments.

FIG. 4B illustrates an example of using the trained ML model 114. The security data 112 are applied to the trained ML model 114 to generate the outputs, which can include follow-on action(s) 116.

Figure 5:
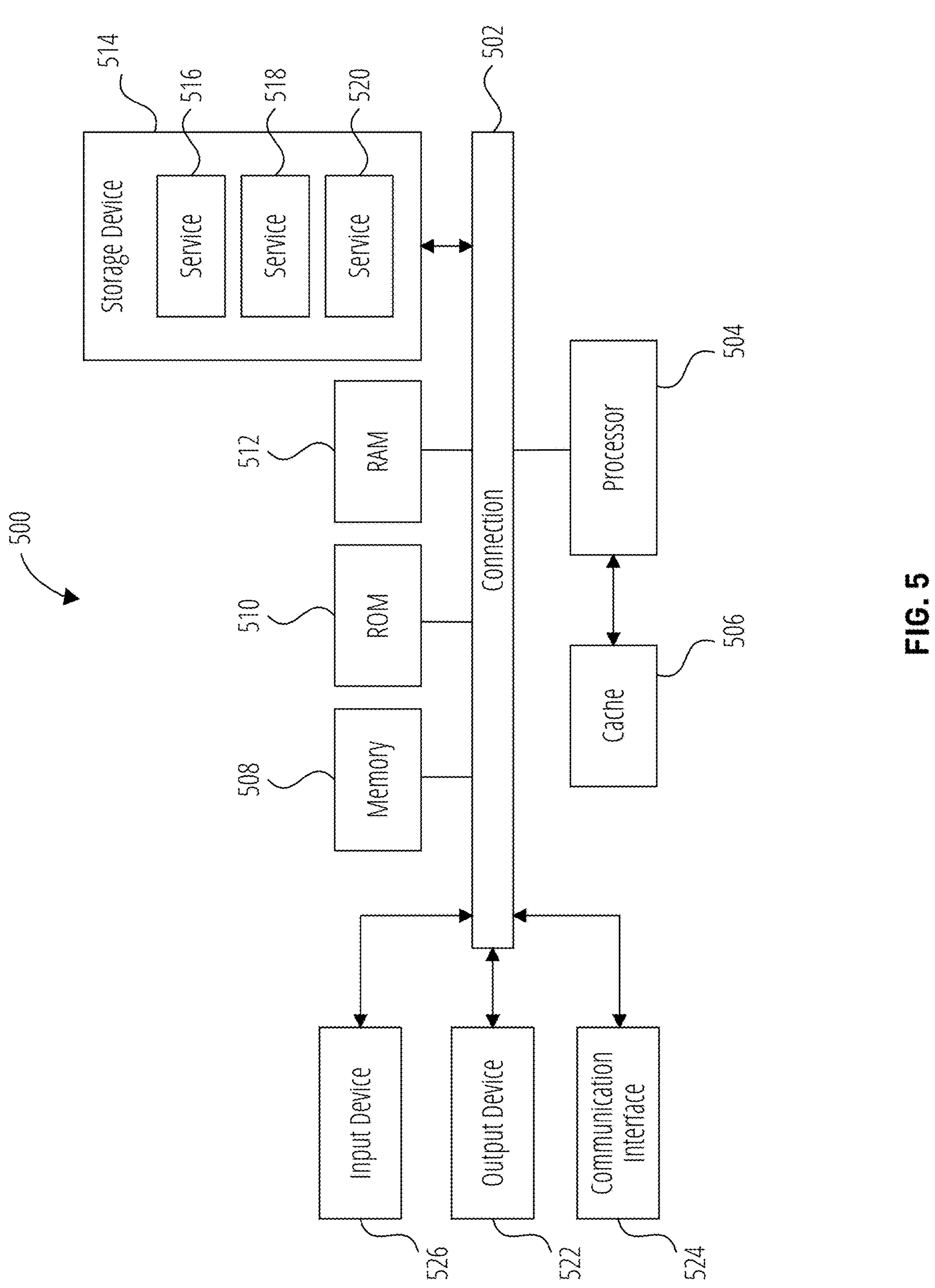
FIG. 5 illustrates a block diagram for an example of a computing device, in accordance with certain embodiments.

FIG. 5 shows an example of computing system 500, which can be for example any computing device configured to perform one or more of the steps of method 200. Computing system 500 can be part of a distributed computing network in which several computers perform respective steps in method 200 and/or the functions of system 100. Computing system 500 can be connected to the other parts of the distributed computing network via connection 502 or communication interface 524.

Connection 502 can be a physical connection via a bus, or a direct connection into processor 504, such as in a chipset architecture. Connection 502 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 500 includes at least one processing unit (CPU or processor 504) and connection 502 that couples various system components including system memory 508, read-only memory (ROM) such as ROM 510, and random access memory (RAM) such as RAM 512 to processor 504. Computing system 500 can include a cache of high-speed memory 506 connected directly with, in close proximity to, or integrated as part of processor 504.

Processor 504 can include any general-purpose processor and a hardware service or software service, such as service 516, service 518, and service 520 stored in storage device 514, configured to control processor 504 as well as a special-purpose processor where software instructions are incorporated into the actual processor design. The services can be one or more steps of method 200 in FIG. 2, for example. Processor 504 may essentially be a completely self-contained computing system, containing multiple cores or processors, a bus, a memory controller, a cache, etc. A multi-core processor may be symmetric or asymmetric.

To enable user interaction, computing system 500 includes an input device 526, which can represent any number of input mechanisms, such as a microphone for speech, a touch-sensitive screen for gesture or graphical input, keyboard, mouse, motion input, speech, etc. Computing system 500 can also include output device 522, which can be one or more of several output mechanisms known to those of skill in the art. In some instances, multimodal systems can enable a user to provide multiple types of input/output to communicate with computing system 500. Computing system 500 can include communication interface 524, which can generally govern and manage the user input and system output. There is no restriction on operating on any particular hardware arrangement, and therefore the basic features here may easily be substituted for improved hardware or firmware arrangements as they are developed.

Storage device 514 can be a non-volatile memory device and can be a hard disk or other types of computer-readable media, which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 514 can include software services, servers, services, etc., that when the code that defines such software is executed by the processor 504, it causes the system to perform a function. In some embodiments, a hardware service that performs a particular function can include the software component stored in a computer-readable medium in connection with the necessary hardware components, such as processor 504, connection 502, output device 522, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or servers, alone or in combination with other devices. In some embodiments, a service can be software that resides in memory of system 100 and performs one or more functions of the method 200 when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data that cause or otherwise configure a general-purpose computer, special-purpose computer, or special-purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or servers, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method of recommending a follow-on action for a security incident, the method comprising:

receiving an indication of a security incident and receiving security data arising from the security incident;

applying the security data to a machine-learning model to determine a follow-on action in response to the security incident;

signaling the follow-on action to security personnel;

receiving feedback from the security personnel, the feedback including indicia whether the follow-on action is a correct response to the security incident;

collecting post-execution security data after the follow-on action is performed, the post-execution security data reflecting a change in a security state of a monitored system caused by the follow-on action;

generating reinforcement training data based on an effect of the follow-on action on the security incident as reflected in the post-execution security data; and training the machine-learning model using the reinforcement training data to update an action-selection policy of the machine-learning model to perform reinforcement learning.

2. The method of claim 1, wherein:

the machine-learning model is an artificial neural network in which weighting coefficients between respective layers are used to combine values of nodes at a layer to generate values at nodes of a subsequent layer in the artificial neural network, training the machine-learning model by using the reinforcement training data includes adjusting the weighting coefficients between one or more layers of the artificial neural network to minimize a loss function representing in part a difference or a proximity between the correct response to the security incident and an output of the machine-learning model in response to applying the security data, wherein the correct response to the security incident is based on the feedback.

3. The method of claim 1, wherein training the machine-learning model by using the reinforcement training data includes fine tuning the machine-learning model by unfreezing a subset of coefficients of the machine-learning model and optimizing a loss function between the correct response to the security incident and an output of the machine-learning model in response to applying the security data.

4. The method of claim 1, further comprising:

obtaining a record of actions taken by the security personnel while responding to the security incident;

determining the correct response to the security incident based on the record of actions taken by the security personnel, when the feedback indicates that the follow-on action that is signaled to the security personnel is not the correct response to the security incident; and including the correct response to the security incident in the feedback.

5. The method of claim 4, further comprising:

determining that the correct response to the security incident is the follow-on action that is signaled to the security personnel, when the feedback indicates that the follow-on action that is signaled to the security personnel is the correct response to the security incident.

6. The method of claim 1, further comprising:

detecting the security incident based on one or more of:

a vulnerability scan of a network and generating scan data, the scan data including data on which detection of the security incident was based, and the scan data including network scan data;

an authenticated network scan data;

vulnerability and asset assessment data, configuration data;

signal captured at endpoints and/or networks;

statistical profiling of network traffic;

file operations at endpoints;

malicious email; or threat intelligence data, wherein the security data applied to the machine-learning model includes the scan data and/or endpoint data.

7. The method of claim 6, further comprising:

collecting, after detecting the security incident, additional data that is determined to be relevant to the security incident, the additional data including ongoing incident response data, telemetry, log data, traffic data, or metadata, wherein the security data applied to the machine-learning model includes the scan data and the additional data.

8. The method of claim 7, wherein the machine-learning model has been trained to use correlations between the scan data and the additional data to predict the follow-on action based on patterns in the scan data.

9. The method of claim 6, wherein:

the follow-on action includes a decision tree having one or more branches at which the security personnel interacts with the network resulting in additional information about the security incident, and the method further comprises:

applying the additional information together with the security data to the machine-learning model to determine another follow-on action in response to the security incident;

signaling the another follow-on action to security personnel;

receiving another feedback from the security personnel, the another feedback including indicia whether the another follow-on action is the correct response to the security incident;

generating reinforcement training data based on the another feedback.

10. The method of claim 1, wherein signaling the follow-on action to the security personnel further includes ranking two or more follow-on actions and assigning respective scores corresponding to likelihoods that the two or more follow-on actions are the correct response to the security incident, and displaying to the security personnel a ranked list of the two or more follow-on actions and/or the two or more follow-on actions with the respective scores.

11. An apparatus comprising:

a processor; and a memory storing instructions that, when executed by the processor, configure the apparatus to:

receive an indication of a security incident and receiving security data arising from the security incident;

apply the security data to a machine-learning model to determine a follow-on action in response to the security incident;

signal the follow-on action to security personnel;

receive feedback from the security personnel, the feedback including indicia whether the follow-on action is a correct response to the security incident;

collect post-execution security data after the follow-on action is performed, the post-execution security data reflecting a change in a security state of a monitored system caused by the follow-on action;

generate reinforcement training data based on an effect of the follow-on action on the security incident as reflected in the post-execution security data; and train the machine-learning model using the reinforcement training data to update an action-selection policy of the machine-learning model to perform reinforcement learning.

12. The apparatus of claim 11, wherein:

the machine-learning model is an artificial neural network in which weighting coefficients between respective layers are used to combine values of nodes at a layer to generate values at nodes of a subsequent layer in the artificial neural network, training the machine-learning model by using the reinforcement training data includes adjusting the weighting coefficients between one or more layers of the artificial neural network to minimize a loss function representing in part a difference or a proximity between the correct response to the security incident and an output of the machine-learning model in response to applying the security data, wherein the correct response to the security incident is based on the feedback.

13. The apparatus of claim 11, wherein training the machine-learning model by using the reinforcement training data includes fine tuning the machine-learning model by unfreezing a subset of coefficients of the machine-learning model and optimizing a loss function between the correct response to the security incident and an output of the machine-learning model in response to applying the security data.

14. The apparatus of claim 11, wherein the instructions further configure the apparatus to:

obtain a record of actions taken by the security personnel while responding to the security incident;

determine the correct response to the security incident based on the record of actions taken by the security personnel, when the feedback indicates that the follow-on action that is signaled to the security personnel is not the correct response to the security incident; and include the correct response to the security incident in the feedback.

15. The apparatus of claim 14, wherein the instructions further configure the apparatus to:

determine that the correct response to the security incident is the follow-on action that is signaled to the security personnel, when the feedback indicates that the follow-on action that is signaled to the security personnel is the correct response to the security incident.

16. The apparatus of claim 11, wherein the instructions further configure the apparatus to:

detect the security incident based on one or more of:

a vulnerability scan of a network and generating scan data, the scan data including data on which detection of the security incident was based, and the scan data including network scan data;

an authenticated network scan data;

vulnerability and asset assessment data, configuration data;

signal captured at endpoints and/or networks;

statistical profiling of network traffic;

file operations at endpoints;

malicious email; or threat intelligence data, wherein the security data applied to the machine-learning model includes the scan data.

17. The apparatus of claim 16, wherein the instructions further configure the apparatus to:

collect, after detecting the security incident, additional data that is determined to be relevant to the security incident, the additional data including ongoing incident response data, telemetry, log data, traffic data, or metadata, wherein the security data applied to the machine-learning model includes the additional data, and the machine-learning model has been trained to use correlations between the scan data and the additional data to predict the follow-on action based on patterns in the scan data.

18. The apparatus of claim 16, wherein:

the follow-on action includes a decision tree having one or more branches at which the security personnel interacts with the network resulting in additional information about the security incident, and the instructions further configure the apparatus to:

apply the additional information together with the security data to the machine-learning model to determine another follow-on action in response to the security incident, signal the another follow-on action to security personnel, receive another feedback from the security personnel, the another feedback including indicia whether the another follow-on action is the correct response to the security incident, and generate reinforcement training data based on the another feedback.

19. The apparatus of claim 11, wherein the instructions cause the apparatus to signal the follow-on action to the security personnel by configuring the apparatus to:

rank two or more follow-on actions and assigning respective scores corresponding to likelihoods that the two or more follow-on actions are the correct response to the security incident, and display to the security personnel a ranked list of the two or more follow-on actions and/or the two or more follow-on actions with the respective scores.

20. A non-transitory computer-readable storage medium, the computer-readable storage medium including instructions that when executed by a computer, cause the computer to:

receive an indication of a security incident and receiving security data corresponding to the security incident;

apply the security data to a machine-learning model to determine a follow-on action in response to the security incident;

signal the follow-on action to security personnel;

receive feedback from the security personnel, the feedback including indicia whether the follow-on action is a correct response to the security incident;

collect post-execution security data after the follow-on action is performed, the post-execution security data reflecting a change in a security state of a monitored system caused by the follow-on action;

generate reinforcement training data based on an effect of the follow-on action on the security incident as reflected in the post-execution security data; and train the machine-learning model using the reinforcement training data to update an action-selection policy of the machine-learning model to perform reinforcement learning.

* * * * *